United States Patent
Barton et al.

(10) Patent No.: US 9,538,218 B2
(45) Date of Patent: Jan. 3, 2017

(54) CONFIGURING AN ENFORCEMENT DEVICE ACCORDING TO A CONTRACT

(75) Inventors: Lukas Barton, Prague (CZ); Vladimir Dubsky, Podebrady (CZ); Pavel Zavora, Hradec Kralove (CZ)

(73) Assignee: Hewlett Packard Enterprise Development LP, Houston, TX (US)

(*) Notice: Subject to any disclaimer, the term of this patent is extended or adjusted under 35 U.S.C. 154(b) by 776 days.

(21) Appl. No.: 13/448,741

(22) Filed: Apr. 17, 2012

(65) Prior Publication Data
US 2013/0275571 A1    Oct. 17, 2013

(51) Int. Cl.
*G06F 15/173* (2006.01)
*H04N 21/254* (2011.01)
*H04L 12/24* (2006.01)
*H04N 21/278* (2011.01)

(52) U.S. Cl.
CPC ...... *H04N 21/2541* (2013.01); *H04L 41/5022* (2013.01); *H04L 41/5038* (2013.01); *H04N 21/278* (2013.01)

(58) Field of Classification Search
USPC ........................................................ 709/223
See application file for complete search history.

(56) References Cited

U.S. PATENT DOCUMENTS

| | | | | |
|---|---|---|---|---|
| 5,982,893 A * | 11/1999 | Hughes | | 705/75 |
| 7,757,268 B2 * | 7/2010 | Gupta et al. | | 726/1 |
| 7,840,669 B2 * | 11/2010 | Dutta et al. | | 709/224 |
| 2008/0077652 A1 | 3/2008 | Grant | | |
| 2010/0049628 A1 * | 2/2010 | Mannava et al. | | 705/27 |
| 2010/0095266 A1 | 4/2010 | Novak | | |
| 2010/0125618 A1 | 5/2010 | Dutta | | |
| 2010/0146037 A1 * | 6/2010 | Little | | 709/203 |
| 2010/0269148 A1 * | 10/2010 | Almeida et al. | | 726/1 |

* cited by examiner

*Primary Examiner* — Brian J Gillis
*Assistant Examiner* — Steve Lin
(74) *Attorney, Agent, or Firm* — Trop, Pruner & Hu, P.C.

(57) ABSTRACT

A repository stores a contract between a service consumer and a service provider that provides a service, the contract specifying a service-level objective associated with a service to be applied for the service consumer. An enforcement device is configured according to the contract, where the configuring causes the enforcement device to perform enforcement of the service-level objective in a connection between the service consumer and the service provider, the connection allowing the service consumer to access the service in response to the enforcement device confirming that the service consumer is associated with the contract.

17 Claims, 5 Drawing Sheets

CONFIGURING AN ENFORCEMENT DEVICE ACCORDING TO A CONTRACT

BACKGROUND

A service-oriented architecture (SOA) provides a paradigm that allows for services to be defined, where the services can be reused for various purposes. The SOA can include service providers and service consumers. A service provider provides a service that can be accessed by a service consumer. Services are made available by service providers over a network to allow service consumers to combine the services and use such combined services for various purposes.

BRIEF DESCRIPTION OF THE DRAWINGS

Some embodiments are described with respect to the following figures.

DETAILED DESCRIPTION

Figure 1:
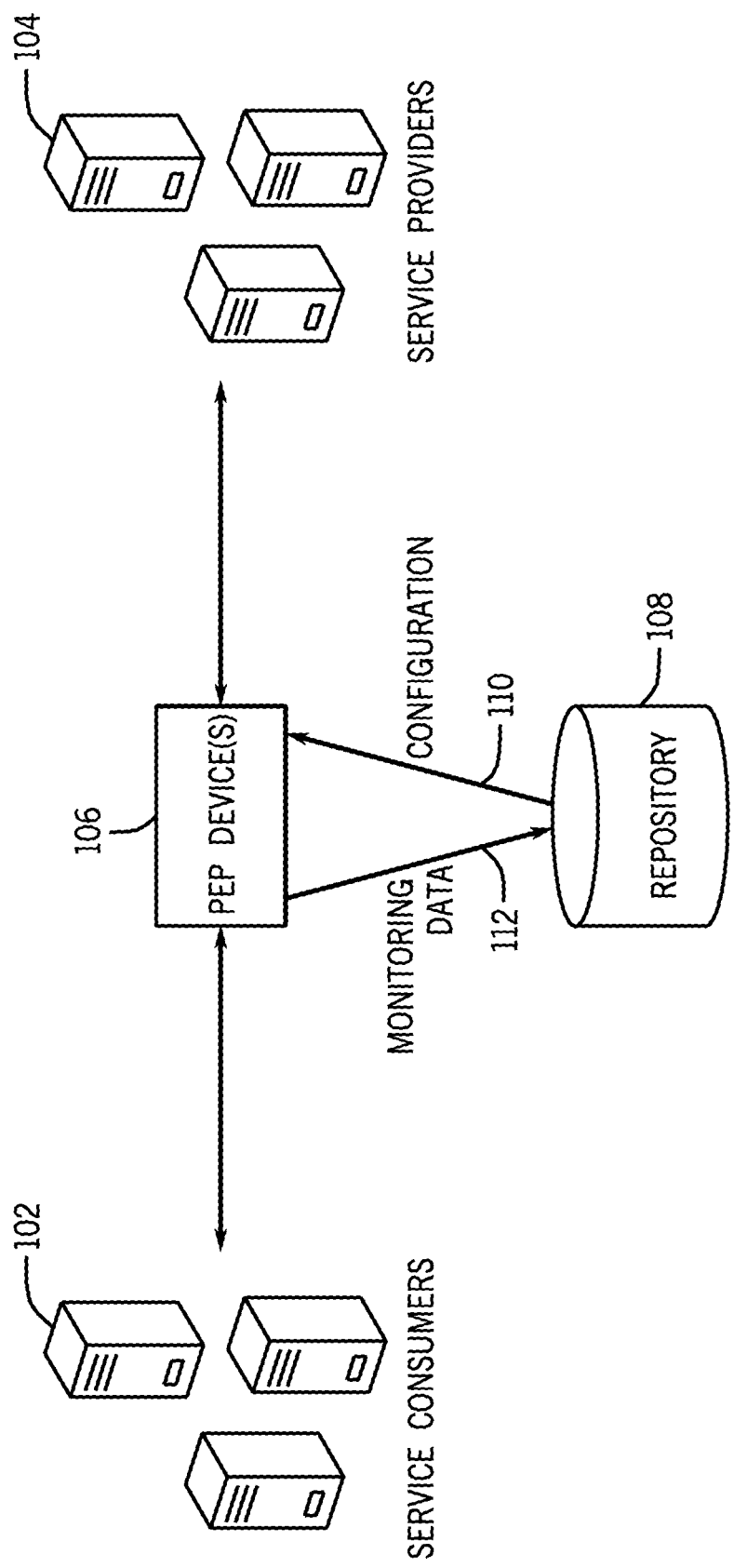
FIG. 1 is a block diagram of an example arrangement that incorporates some implementations.

In a service-oriented architecture (SOA) paradigm, services can be developed by service providers and published for access by service consumers. As examples, the services can be published in a service registry. Examples of services that can be provided by service providers include web services, where a web service can be designed to support machine-to-machine interaction over a network. In other examples, other types of services can be provided by service providers. A "service" can refer generally to machine-readable instructions that can perform predefined tasks, and which can be accessed and used by service consumers for various purposes.

A service has a service lifecycle, which can have several stages, including a development stage, a testing stage, and a production stage. The three stages of the lifecycle of a service are provided for purposes of example—in other examples, there can be different combinations of lifecycle stages. A testing stage is used to test the service, and a production stage is used to provide a service for access and use by service consumers.

The development stage of the service lifecycle refers to the stage at which the service is being developed (e.g. machine-readable instructions are created for defining the service). During the development stage, various information can be associated with the service that is being developed. Such information can include runtime policies for the service, a service-level objective for the service, and other information. A runtime policy can refer to some predefined rule that is to be adhered to during execution of the service. For example, a runtime policy can specify that electronic mail should not have an attachment larger than some predefined size. As another example, a runtime policy can specify that a service should not use more than some predefined amount of storage or communications bandwidth.

A service-level objective can refer to a target measureable characteristic that is to be satisfied in the provision of the service. A service-level objective can be in the form of a quality-of-service (QoS) definition, or a term of usage. Example SLOs can include the following: a target communications throughput, a target response time, a target availability of resources, a QoS level (which can be one of multiple levels that specify differing levels of quality that are provided in the performance of the service), a target service class, and so forth.

In some cases, information associated with a service during the development stage of the service lifecycle may become disconnected from the service during another stage of the service lifecycle, such as during the testing stage and/or the production stage. Stated differently, the information that is associated with the service during the development stage may not be used during the testing and/or production stage. The result can be that information such as a runtime policy or a service-level objective may not be properly applied during the testing and/or production stage.

In accordance with some implementations, information associated with a service during a particular stage (e.g. development stage) of a service lifecycle is automatically applied during at least another stage of the service lifecycle (e.g. testing stage, production stage, etc.). A contract can be defined for a service in the particular stage (e.g. development stage) of the service, where the contract can specify a service-level objective, among other information. A "contract" can refer to any information that specifies an agreement, arrangement, or other understanding between a service consumer and a service provider. A contract can be specific to a particular service consumer. The service-level objective specified by the contract is to be enforced during execution of the service in another stage of the service lifecycle. In addition to the contract that specifies a service-level objective, a runtime policy (or multiple runtime policies) can also be associated with the service in the development stage, to be enforced during execution of the service in another lifecycle stage.

Note that, similar to a service, a contract can also have a contract lifecycle having multiple stages, including a testing stage and a production stage, as examples. For a service or a contract, a transition between stages of the respective lifecycle can be conditioned based on predefined machine-evaluated rules or human approval.

FIG. 1 is a block diagram of an example arrangement that includes service consumers 102 and service providers 104. A service consumer can refer to either equipment (e.g. a computer, portable digital assistant, etc.) usable to access a service, or a consumer entity (e.g. individual, an application, etc.) that employs equipment to access the service, or both the equipment and the entity. A service provider can refer to equipment (e.g. a server computer, a collection of server computers, etc.) that can be employed by a provider entity (e.g. an enterprise such as a business concern or other type of enterprise), or both the server equipment and the provider entity.

A service consumer 102 can access a service provided by a service provider 104 in a connection that is established through one or multiple policy enforcement point (PEP) devices 106. A PEP device (or more generally, an enforcement device) can be used to enforce a policy and/or service-level objective associated with the service, on behalf of a service consumer. A PEP device 106 can be implemented with one or multiple computers or other types of electronic devices. A connection between a service consumer and a service provider for accessing a service can refer to a session or other communication flow that allows the service consumer 102 to access the service provided by the service provider 104.

The equipment that provides services can also be referred to as governed endpoints. A governed endpoint is subject to a service-level objective and/or a runtime policy to be provided to a service consumer during execution of the respective service. As noted above, a service-level objective can be specified in a contract between a service consumer and a service provider.

In some implementations, a central repository 108 is provided, in which services and their associated governed endpoints can be described. Additionally, the repository 108 can store various information associated with the services, including contracts, runtime policies, and other information. The central repository 108 can represent a single repository or a collection of repositories, which can be stored in a storage subsystem or a collection of storage subsystems.

Information, such as contracts and runtime policies, associated with services can be defined during the development stage of each respective service lifecycle. In accordance with some implementations, such information can be stored in the central repository 108 during the development stage.

In addition to the ability to store information associated with services, the central repository 108 can be associated with one or multiple logic modules to perform various predefined tasks. One such predefined task is to configure (at 110) a connection between a service consumer 102 and a service provider 104, where the connection is configured with the corresponding contract and associated runtime policy(ies). The configuration of the connection includes configuring one or multiple corresponding PEP devices 106.

Another predefined task that can be performed by logic module(s) associated with the central repository 108 is data monitoring. Data associated with execution of the service can be monitored (at 112) and provided to the central repository 108 for storing with the service.

This monitored data can be used to check the consistency of information stored within the central repository 108 about the runtime environment. This can allow for the identification of governed endpoints that were provisioned without following a specified configuration process, and where repository documentation and approval of certain individuals were skipped. Such checking allows the repository information to be more reliable.

The collection of monitored data about the runtime environment can also be used to verify that a specified service-level objective of a contract is followed, and can also allow service usage by individual service consumers is monitored. Performance metrics and policy violation statistics can be collected and compared to the contract service-level objective to determine whether the contract service-level objective was followed.

During operation (such as during a testing stage or production stage of a service lifecycle), a PEP device (or multiple PEP devices) can perform enforcement of a contract-specified service-level objective and runtime policy(ies) with respect to provision of a service to a particular service consumer. For example, the PEP device 106 can perform policy validation (e.g. to validate that a runtime policy is being satisfied in the provision of the service to the particular service consumer), and can ensure that a service-level objective specified by a corresponding contract between the particular service consumer and the particular service provider is satisfied. As a further example, in the testing stage, access of an instance of the service by the service consumer can be tested, with the testing allowing a determination that the service-level objective of the contract can be met.

In this way, information (including policy information and a service-level objective specified by a contract) defined during a development stage of a service lifecycle can be applied automatically to other stages of the service lifecycle.

More generally, a contract and other information can be provided to any stage of a lifecycle of a service, where the lifecycle has multiple stages. A PEP device can enforce access of the service during a stage of a service lifecycle according to the service-level objective of the contract after conditions defined in the corresponding contract lifecycle has been met. As noted above, a contract lifecycle can have multiple stages. A contract being in its testing stage allows a service consumer to test access of an instance of the service that has been created or deployed during a development stage of the service lifecycle. Also, it can be determined that the service-level objective of the contract can be met during the testing stage of the contract lifecycle before the service consumer is given access to the instance of the service during a production stage of the service lifecycle.

Figure 2:
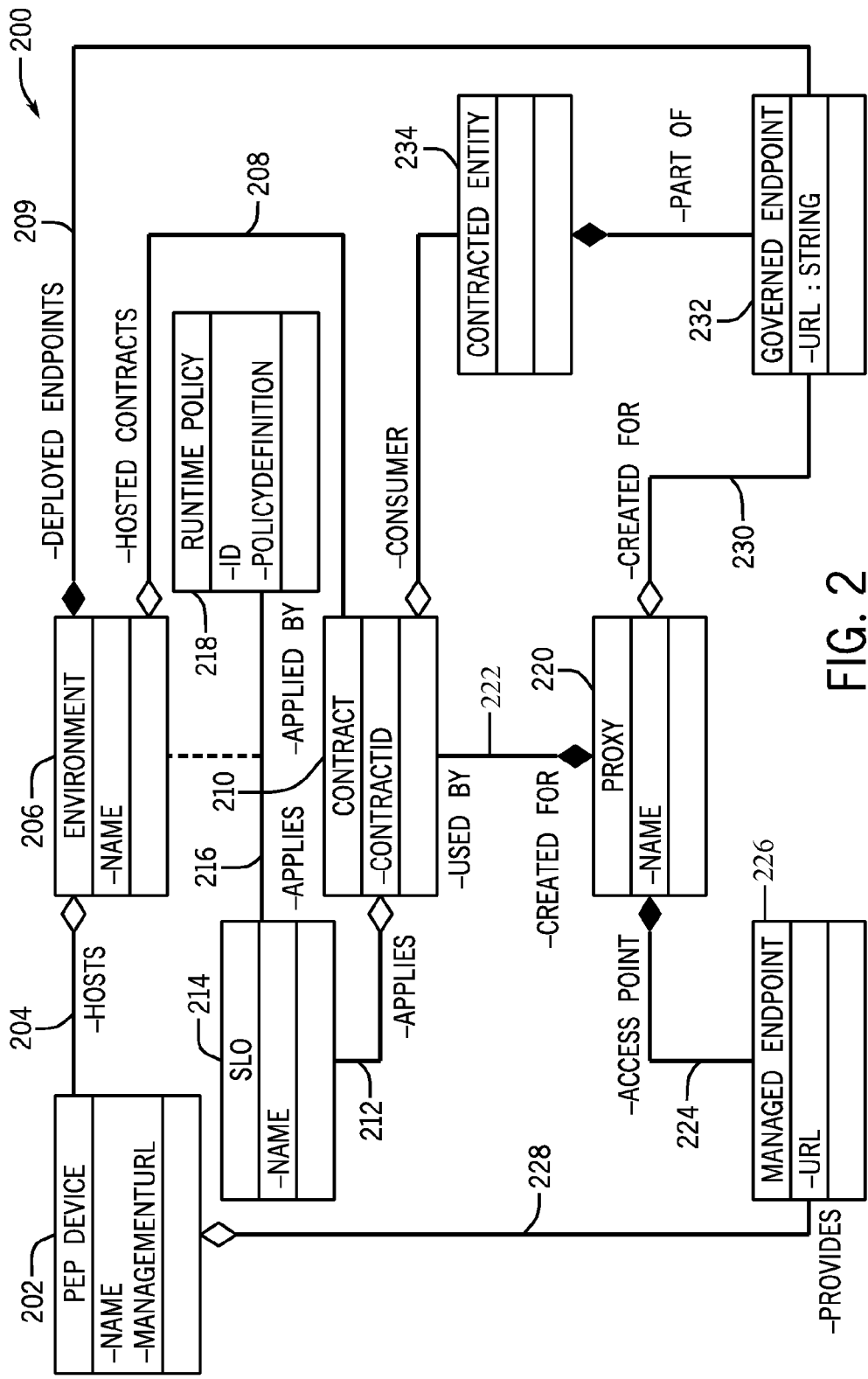
FIG. 2 is a schematic view of an example repository data model according to some implementations.

An example data structure that can be associated with a service and which can be stored in the central repository 108 is depicted in FIG. 2. FIG. 2 shows a repository data model 200, associated with a service, that has various nodes that are inter-related by respective links. Each link between a pair of nodes indicates the specified relationship between the nodes. Although a specific example is shown in FIG. 2, it is noted that different data structures can be used in other examples.

A PEP Device node 202 identifies a PEP device 106 (or multiple PEP devices 106) that is (are) to provide policy and contract enforcement for a service to be provided by a service provider to a service consumer. The PEP Device node 202 can contain a name of a PEP device as well as a URL (uniform resource locator) or other address of the PEP device used for the PEP device configuration.

A link 204 indicates that the PEP device identified by the PEP Device node 202 is hosted in a particular environment (represented by an Environment node 206). The environment is identified by a corresponding name. The environment can include an associated contract (or contracts), as well as a governed endpoint (or governed endpoints) for provision of the respective service. Contract (or contracts), as well as a governed endpoint (or governed endpoints) used for provisioning of the respective service are associated with an environment. A link 208 inter-relates the Environment node 206 to a Contract node 210, which identifies one or multiple contracts by a contract identifier (contract ID). The link 208 indicates that the environment hosts the identified contract(s).

A link 209 between the Environment node 206 and a Governed Endpoint node 232 specifies that the respective service is deployed using governed endpoint(s) identified (by a URL or other address) in the Governed Endpoint node 232 in the given Environment node 206.

A link 212 between the Contract node 210 and an SLO node 214 indicates that the contract identified by the Contract node 210 specifies a service-level objective, which is represented by an SLO node 214. The SLO node 214 contains a name attribute to identify the respective service-level objective.

A link 216 between the SLO node 214 and a Runtime Policy node 218 indicates that there is a relationship between the service-level objective identified by the SLO node 214 and a corresponding runtime policy (or policies) identified by a Runtime Policy node 218, which contains an ID attribute(s) to identify the runtime policy(ies), and a policyDefinition attribute(s) to describe the corresponding policy(ies).

A Proxy node 220 represents a proxy for a PEP device 106 that is responsible for enforcement of the contract represented by the Contract node 210. The Proxy node 220 contains a name attribute that includes a name of the proxy. Note that the Proxy node 220 can identify multiple proxies (for multiple corresponding PEP devices) if contract enforcement is to be applied by multiple PEP devices.

A link 222 between the Proxy node 220 and the Contract node 210 indicates that the contract identified by the Contract node 210 uses the proxy represented by the Proxy node 220.

A link 224 indicates a relationship between the Proxy node 220 and a Managed Endpoint node 226 that contains a URL or other address of an entity at which the PEP device listens for messages from a service consumer for the purpose of performing contract enforcement. A link 228 interconnects the Managed Endpoint node 226 and the PEP Device node 202.

A link 230 specifies a relationship between the Proxy node 220 and a governed endpoint represented by a Governed Endpoint node 232, which contains a URL attribute identifying the URL or other address of the governed endpoint.

A Contracted Entity node 234 is provided between the Contract node 210 and the Governed Endpoint node 232 to indicate that the contract identified by the Contract node 210 is used to govern the governed endpoint identified by the Governed Endpoint node 232.

Figure 3:
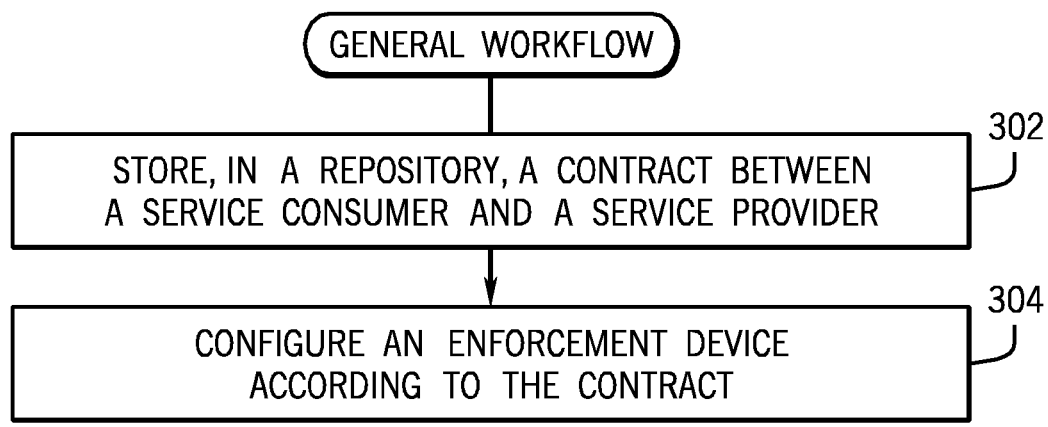
FIGS. 3 and 4 are flow diagrams of processes according to various implementations.

FIG. 3 is a flow diagram of a general workflow according to some implementations. The workflow can be performed during a development stage of the service lifecycle, for example. The workflow of FIG. 3 stores (at 302) information associated with a service into a repository (such as the central repository 108 of FIG. 1). The information includes a contract between a service consumer and a service provider, and the contract can specify a service-level objective to be satisfied during execution of the service during other stage(s) of the service lifecycle.

The workflow of FIG. 3 further configures (at 304) an enforcement device (e.g. PEP device 106 in FIG. 1) according to the information for the service, including the contract. The configuration is a configuration (at 110 of FIG. 1) of a connection between a service consumer and a service provider that is to be used to access the service. The configured connection allows the service consumer to access the service in response to the enforcement device confirming that the service consumer is associated with the contract.

Figure 4:
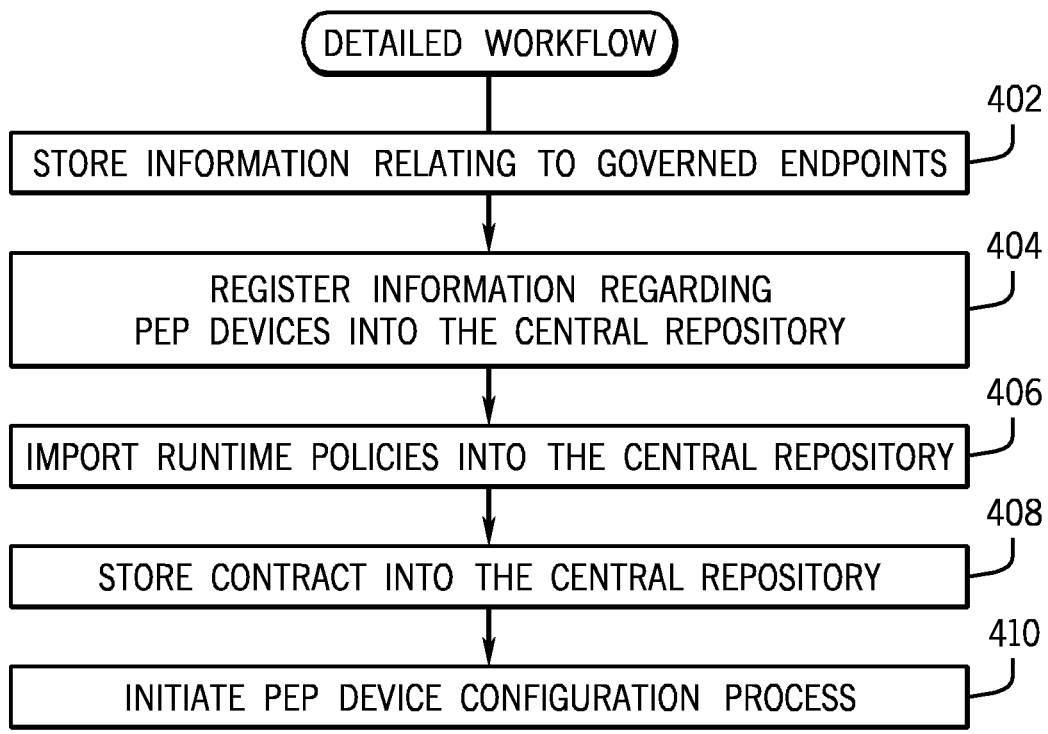

FIG. 4 is a flow diagram of a more detailed workflow, according to further implementations. The workflow of FIG. 4 stores (at 402) information relating to governed endpoints (that provide respective services) into the central repository 108 of FIG. 1. In addition, the workflow registers (at 404) information regarding PEP devices 106 into the central repository 108. As part of the registration, an environment (corresponding to the Environment node 206 of FIG. 2, for example) is also assigned to each of the PEP devices. Note that there can be multiple environments for multiple stages of a service lifecycle, including a testing stage, a production stage, and so forth.

Runtime policies are then created and imported (at 406) into the central repository 108. In addition, a contract is produced, where the contract specifies a corresponding service-level objective. The contract is stored (at 408) into the central repository 108.

The workflow then initiates (at 410) a PEP device configuration process (110 in FIG. 1). The configuration process involves configuration of a channel between a service consumer and a service provider through a respective PEP device (or PEP devices). The configuration of the channel is based on the corresponding contract, as well as other information in the central repository 108.

The PEP device configuration process can be performed automatically. For example, the PEP configuration process can be performed automatically in response to a state transition within a repository process relating to an artifact that references a governed endpoint (and the respective service provided by the governed endpoint). An example of an artifact that references a governed endpoint is a contract (see relationship between the Contract node 210 and the Governed Endpoint node 232 through the Contracted Entity node 234 of FIG. 2 as an example).

A repository process relating to a contract can include the following phases: request contract, approve contract for development environment, approve contract for production environment, and so forth. A state transition between a given one of the foregoing phases may trigger the automatic PEP device configuration process noted above.

Other examples of artifacts that reference a governed endpoint can include a service (the service references its implementation that in turn references the governed endpoint), an SLO specified by a contract, a runtime policy, and so forth.

In some implementations, a user interface wizard can also be used for performing a PEP device configuration process. In some examples, the user interface wizard can be used in situations where the automatic PEP device configuration process performed above encounters a fault or error.

Figure 5:
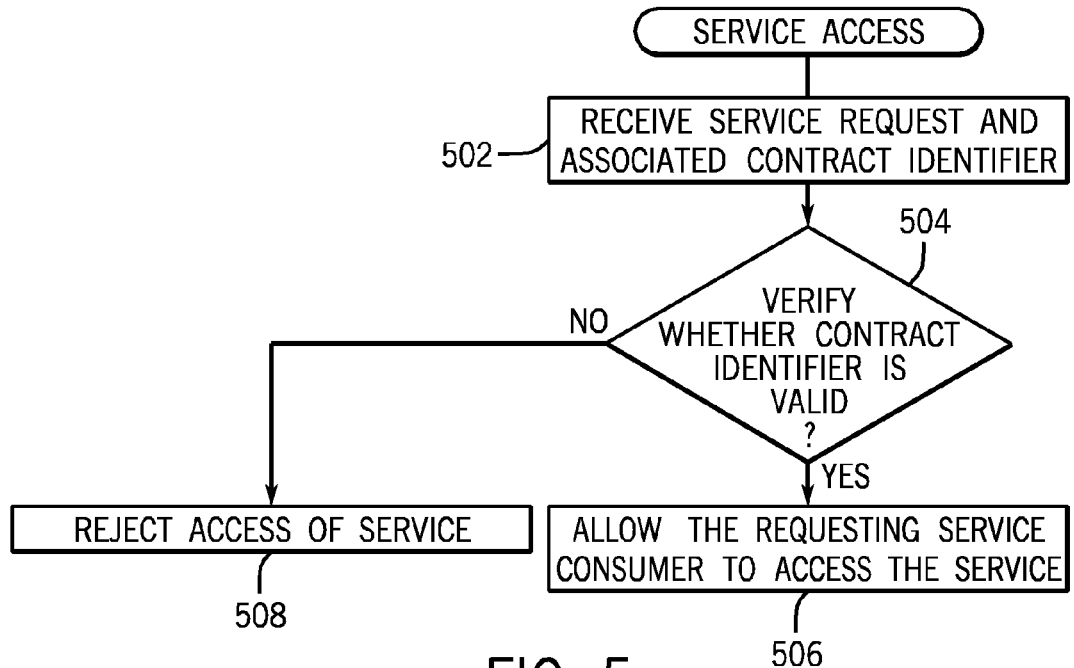
FIG. 5 is a flow diagram of a process of providing service access, according to some implementations.

FIG. 5 is a flow diagram of a process performed to allow access of a service by a service consumer. During operation, such as during the production stage or other stage of a service lifecycle, a service consumer desiring to access a service can provide a service request and an associated contract identifier. The service request and associated contract identifier is received (at 502) by a PEP device 106. The provision of the contract identifier allows for the PEP device 106 to determine that the requesting service consumer has a properly registered contract within the central repository 108 to allow access to the service that is subject to runtime governance. The service request can also include an identifier of the requesting service consumer—this consumer identifier can be derived from a credential used by the service consumer when connecting to the PEP device 106.

The contract identifier can be sent as part of the message containing the service request, or in another message. Upon receiving the contract identifier, the PEP device 106 verifies (at 504) whether the contract identifier is valid. Such verification can be based on accessing the central repository 108 to determine whether a corresponding contract has been provided for the requesting service consumer.

If the PEP device 106 is able to verify the contract identifier, then the PEP device 106 allows (at 506) the requesting service consumer to access the service. On the other hand, if the PEP device 106 is unable to verify the contract identifier, then the PEP device rejects (at 508) access of the service.

As noted above, a service lifecycle has multiple stages, including the development stage, testing stage, and production stage, as examples. The use of the information in the central repository 108 allows a service and the associated contract (and other information) to be moved between the different stages of the service lifecycle, to ensure that the service-level objective of the contract and runtime policies are enforced in each of the stages of the service lifecycle.

In accordance with some examples, an application programming interface (API) can be provided to allow the following functionality. The API can list endpoints (service consumers and/or service providers) associated with a PEP device, along with the corresponding configuration. The API can create or update endpoint(s) on a PEP device based on a given configuration. The API can read or write policy definitions to the PEP device. The API can also be used to obtain performance metrics related to a particular contract.

In accordance with some implementations, service lookup can be based on information, including the contract ID, in the central repository 108. In this way, a service consumer does not have to be configured with the URL or other address of the service, but instead can use the contract ID, along with other information, to perform the service lookup. As a result, as the service consumer transitions between different environments, such as between different stages of the service lifecycle, the service consumer can access the service in the new environment without having to alter the service consumer's configuration. This may be useful if the service consumer is an application deployed on multiple physical machines—the ability to access the service using information in the central repository 108 can avoid having to change the configuration of each of the physical machines.

Figure 6:
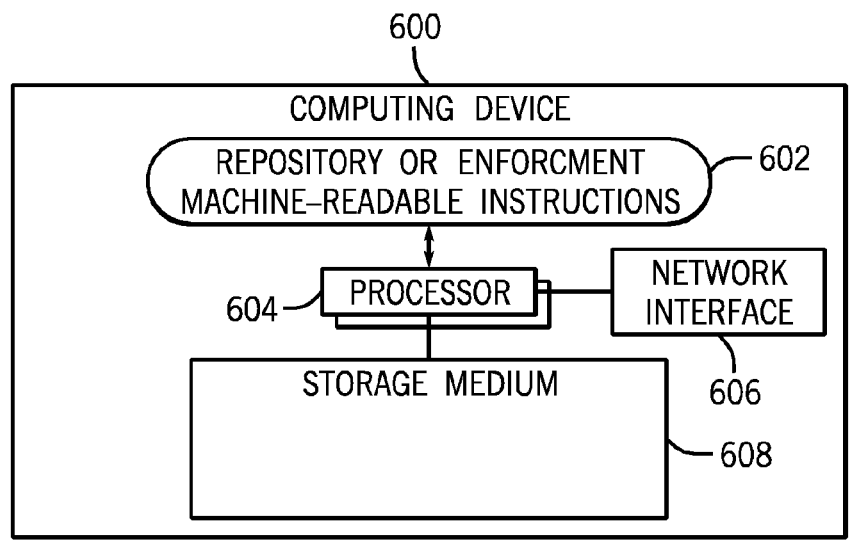
FIG. 6 is a block diagram of a system according to some implementations.

FIG. 6 is a block diagram of a computing device 600 incorporating some implementations. The computing device 600 can be a platform that provides the repository 108 of FIG. 1, or alternatively, the computing device 600 can be a PEP device 106.

The computing device 600 can include machine-readable instructions 602, which can be repository machine-readable instructions to implement logic modules associated with the repository 108, or enforcement machine-readable instructions to implement tasks of the PEP device 106.

The machine-readable instructions are executable on one or multiple processors 604, which can be connected to a network interface 606 (to allow the computing device 600 to communicate over a network) and a storage medium (or storage media) 608 (to store data). A processor can include a microprocessor, microcontroller, processor module or subsystem, programmable integrated circuit, programmable gate array, or another control or computing device.

The storage medium (or storage media) 608 can be implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   storing, in a repository, a contract between a service consumer and a service provider that provides a service, the contract specifying a service-level objective associated with the service to be applied for the service consumer, the contract being associated with the service during a first stage of a lifecycle of the service;
   configuring an enforcement device according to the contract, where the configuring causes the enforcement device to perform enforcement of the service-level objective in a connection between the service consumer and the service provider, the connection allowing the service consumer to access the service, in a second, different stage of the lifecycle of the service, in response to the enforcement device confirming that the service consumer is associated with the contract;
   storing, in the repository, information that enables the service consumer to access the service by looking up the service in the repository using an identifier of the contract;
   receiving, by the enforcement device, the identifier of the contract from the service consumer; and
   determining, by the enforcement device, whether the identifier of the contract is valid,
   wherein the enforcement device confirming that the service consumer is associated with the contract is in response to determining that the identifier of the contract is valid.

2. The method of claim 1, further comprising:
   rejecting, by the enforcement device, access of the service in response to the enforcement device determining that the identifier of the contract is invalid.

3. The method of claim 1, wherein the identifier of the contract is received with a request from the service consumer for access of the service.

4. The method of claim 1, wherein the service is a service of a service-oriented architecture.

5. The method of claim 1, further comprising:
   providing the contract to any lifecycle stage of a plurality of stages of the lifecycle of the service; and
   enforcing, by the enforcement device, access of the service according to the service-level objective of the contract after conditions defined in a contract lifecycle have been met.

6. The method of claim 5, wherein the contract lifecycle comprises multiple stages including a testing stage, wherein the contract being in the testing stage of the contract lifecycle allows the service consumer to access an instance of the service that has been created or deployed during the first stage of the lifecycle of the service.

7. The method of claim 6, further comprising determining that the service-level objective of the contract can be met during the testing stage of the contract lifecycle before the service consumer is given access to the instance of the service during the second stage of the lifecycle of the service.

8. An article comprising at least one non-transitory machine-readable storage medium storing instructions that upon execution cause a system to:
- associate information with a service during a development stage of a lifecycle of a service, the information including a contract that specifies a service-level objective associated with the service to be provided by a service provider, and the contract being between a service consumer and the service provider;
- store the information in a repository;
- configure an enforcement device according to the information, where the configuring causes the enforcement device to perform enforcement of the service-level objective in a connection between the service consumer and the service provider, the connection allowing the service consumer to access the service in response to the enforcement device confirming that the service consumer is associated with the contract;
- perform lookup of the service using an identifier of the contract;
- receive, by the enforcement device, the identifier of the contract from the service consumer; and
- determine, by the enforcement device, whether the identifier of the contract is valid,
- wherein the enforcement device confirming that the service consumer is associated with the contract is in response to determining that the identifier of the contract is valid.

9. The article of claim 8, wherein the instructions upon execution cause the system to further:
- reject, by the enforcement device, access of the service in response to the enforcement device determining that the identifier of the contract is invalid.

10. A system comprising:
- a repository to store a contract between a service consumer and a service provider that provides a service, the contract having an identifier and specifying a service-level objective associated with the service to be applied for the service consumer, the contract associated with the service during a development stage of a lifecycle of the service; and
- at least one processor to:
  - configure an enforcement device according to the contract, where the configuring causes the enforcement device to perform enforcement of the service-level objective in a connection between the service consumer and the service provider, the connection allowing the service consumer to access, in a second, different stage of the lifecycle of the service, the service in response to the enforcement device confirming that the service consumer is associated with the contract, and
  - perform a lookup of the service in the repository using an identifier of the contract, the lookup allowing access of the service by the service consumer;
  - receive the identifier of the contract from the service consumer; and
  - determine whether the identifier of the contract is valid,
  - wherein the enforcement device confirming that the service consumer is associated with the contract is in response to determining that the of the contract identifier is valid.

11. The method of claim 1, wherein the repository includes descriptions of services that include respective identifiers of contracts.

12. The article of claim 8, wherein the lookup of the service using the identifier of the contract is performed in each of a production stage and a testing stage of the lifecycle of the service, the testing stage to test the service, and the production stage to provide the service for use by service consumers.

13. The article of claim 8, wherein storing the information in the repository comprises further storing a runtime policy of the service in the repository.

14. The article of claim 8, wherein the instructions upon execution cause the system to further monitor data during execution of the service, and store the monitored data in the repository.

15. The article of claim 8, wherein the instructions upon execution cause the system to further allow, by the enforcement device, access of the service by the service consumer during a second stage of the lifecycle of the service.

16. The system of claim 10, wherein the repository is to further store a runtime policy associated with the service.

17. The article of claim 15, wherein the second stage is one of a production stage and a testing stage of the lifecycle of the service, and wherein the lookup of the service using the identifier of the contract is performed during the second stage.

* * * * *